United States Patent [19]

de Nora et al.

[11] 4,246,090

[45] Jan. 20, 1981

[54] NOVEL CATIONIC MEMBRANES

[75] Inventors: Oronzio de Nora; Luigi Giuffrè; Giovanni Modica, all of Milan, Italy

[73] Assignee: Oronzio de Nora Impianti Elettrochimici S.p.A., Milan, Italy

[21] Appl. No.: 13,829

[22] Filed: Feb. 22, 1979

[30] Foreign Application Priority Data

Jan. 17, 1979 [IT] Italy .............................. 19354 A/79

[51] Int. Cl.³ .......................... C25B 13/08; C25B 1/34
[52] U.S. Cl. ..................................... 204/296; 204/128; 204/98; 204/252
[58] Field of Search ............... 204/296, 252, 98, 59 R, 204/180 P, 128; 521/31; 526/23

[56] References Cited

U.S. PATENT DOCUMENTS

| 3,657,104 | 4/1972 | Hodgdon, Jr. .................. 204/180 P |
| 3,821,127 | 6/1978 | Mizutani et al. ..................... 204/296 |
| 4,101,395 | 7/1978 | Motani et al. ........................ 204/252 |
| 4,123,336 | 10/1978 | Seko et al. ............................. 204/98 |

*Primary Examiner*—R. L. Andrews
*Attorney, Agent, or Firm*—Hammond & Littell, Weissenberger and Muserlian

[57] ABSTRACT

Cationic membranes permeable to ions but fluid impermeable comprising a partly sufonated terpolymer of styrene, divinylbenzene and at least one member of the group consisting of 2-vinylpyridine, 4-vinylpyridine and acrylic acid, the degree of sulfonation varying through the membrane cross-section from a maximum at the anodic surface to a minimum at the cathodic surface, their preparation, their use in electrolysis cells and electrochemical processes.

9 Claims, No Drawings

NOVEL CATIONIC MEMBRANES

STATE OF THE ART

Cationic membranes which are selectively permeable to cations are widely used in electrochemical systems such as in electrolysis cells, batteries, electrodialysis cells, etc. In chlor-alkali cells, for example, they act as a barrier against the back-diffusion of hydroxyl ions produced in the cathode compartment towards the anode compartment while allowing migration of alkali metal ions in the opposite direction. Generally speaking, a cationic membrane, like any ionic membrane, should exhibit a good mechanical and chemical resistance, a low ohmic drop, imperviousness to fluid flow and a high transport number or permselectivity.

Commercially available cationic membranes, particularly for use in chlor-alkali cells, are most often made of thin sheets of a perfluorocarbon polymer having pendant chains carrying negative polar groups such as sulfonic acid groups and/or carboxylic acid groups. These membranes have a good chemical stability due to the absence of carbon-hydrogen bonds, and a reasonable mechanical stability though they are not cross-linked. However, they present serious limitations in terms of cation selectivity which arise from the fact that by increasing the density of sulfonic acid groups or of carboxylic acid groups to lower the electrical resistance of the membrane, the ion selectivity drastically falls, especially when operating with high concentrations of caustic soda in the cathodic compartment. This lowering of the transport number is caused by counter migration of hydroxyl ions through the hydration water inside the membrane. In fact, sulfonic acid groups and, to a lesser degree, carboxylic acid groups have strong hydrophilic properties.

In practice, a compromise is sought which gives a reasonably low voltage drop across the membrane together with a reasonable current efficiency. Usually, laminated membranes having a thickness of about 0.13–0.5 mm have equivalent weights of about 1500 to 1000. Nevertheless, the current efficiency rarely exceeds 80% and usually falls drastically with caustic concentration in the catholyte above 5 N.

Various expedients have been tried to improve the hydroxyl ion rejection properties of cationic membranes such as producing a 0.005–0.25 mm thick layer of perfluorocarbon resin containing sulfonamide groups over the surface of the perfluorosulfonic acid membrane exposed to caustic to reduce the hydrophilic properties of the resin and therefore the hydroxyl ion back migration.

The substitution of sulfonic acid groups with the less hydrophilic carboxylic acid groups as the cation exchange agents in the pendant chains of the perfluorocarbon polymer have also been attempted with the same intent of reducing the back migration of hydroxyl ions, but carboxylic acid groups have poor ion-exchange properties with respect to sulfonic acid groups. Sulfonated copolymers of divinylbenzene and styrene which are used satisfactorily as cation exchange membranes in electrodialysis have not found application in chlor-alkali cells because of extremely poor ion selectivity.

OBJECTS OF THE INVENTION

It is therefore a primary object of the present invention to provide an improved cationic membrane having a low electrical resistance and a high selectivity suitable for chlor-alkali electrolysis cells.

It is another object to provide a novel method for preparing said improved cationic membranes.

It is a further object of the invention to provide novel electrochemical cells equipped with the improved membranes and to provide a novel electrochemical process where the anode and cathode compartments are separated by the said membranes.

These and other objects and advantages will become a apparent from the following description.

THE INVENTION

The novel cationic membranes of the invention which are fluid impermeable but permeable to ions comprise a partly sulfonated terpolymer of styrene, divinylbenzene and at least one member of the group consisting of 2-vinylpyridine, 4-vinylpyridine and acrylic acid, the degree of sulfonation varying through the membrane cross-section from a maximum on the anodic surface to a minimum at the cathodic surface.

The membranes may be in the form of thin sheets of the terpolymer per se or may be formed by polymerizing the mixture of monomers directly on a supporting matrix made of an inert porous material in sufficient amounts to make the same fluid impervious. The pyridine containing polymers are preferably formed on a matrix support such as asbestos paper or felts or meshes of synthetic fibers such as polyesters or polytetrafluoroethylene.

It has been ascertained that an extremely efficient cation exchange membrane is obtained when the equivalent weight which is the molecular weight of the polymer divided by the number of sulfonic acid groups is between 400 and 1300, preferably 600 to 1200, on the anode side of the membrane cross-section and is minimum on the cathode side of the membrane cross-section where the equivalent weight is between 1000 and infinity, preferably between 1400 and 2000.

The cation exchange sites near the cathode side of the membrane are supplied either by the nitrogen atom of the pyridine molecule which in the strongly basic environment such as that existing in the cathode compartment of a chloralkali cell, assumes a negative polarity due to the presence of its electro-pair or doublets or by the carboxylic acid groups of the acrylic acid. Both of the said groups have a polarity substantially lower than the sulfonic acid group and therefore the polarity of the sulfonated copolymer may be controlled along the cross-section of the membrane by varying the degree of sulfonation.

The reduced hydrophilic properties of carboxylic acid groups and especially of the pyridine groups appear to be effective in reducing hydroxyl ions back migration. Moreover, it has been unexpectedly observed that even though the presence of the highly hydrophilic sulfonic acid groups is substantially excluded for a depth of about 0.025 to 0.075 mm from the surface of the membrane exposed to the catholyte, the electric resistance of the membrane does not increase significantly. On the other hand, if, for example, the polymer of styrene, divinylbenzene and 2- or 4-vinylpyridine is not sulfonated for a substantial depth from the surface of the membrane exposed to the anolyte, that is down to about 0.075–0.1 mm from the cathodic surface, the membrane is substantially an insulator and ionic current cannot be passed through the cell.

The novel cationic membranes of the invention have a strong polarity over the portion of their cross-section facing the anolyte which is imparted by the high degree of sulfonation of the polymer in this region and have a lower polarity over the portion of their cross-section facing the catholyte due to a lower degree of sulfonation of the polymer or to the substantial absence of sulfonic acid groups in this region. Therefore, the high cation-exchange properties of sulfonic acid groups is associated with the lower hydrophilic properties of pyridine or of carboxylic acid groups.

The sulfonation degree may decrease gradually from the anodic side to the cathodic side throughout the thickness of the membrane by providing a sheet of terpolymer of styrene, divinylbenzene and either 2- or 4-vinylpyridine or acrylic acid and then contacting only one side of the sheet with the appropriate sulfonating agent and controlling the temperature and the time of exposure to obtain a decreasing degree of sulfonation from a maximum at the exposed surface to a minimum at the unexposed surface.

The molar ratio between styrene and 2- or 4-vinylpyridine in the terpolymer may vary between ⅛ and 1/1 and the molar ratio between styrene and acrylic acid in the terpolymer may vary between ½ and 2/1. The molar amount of cross-linking agent or divinylbenzene, may vary, in both cases, between 8% and 20%.

Preferably, the thickness of the membrane is between 0.13–2.5 mm and more preferably, when it is an unsupported membrane, it may be from 0.5–1.25 mm thick.

According to another embodiment of the invention, the degree of sulfonation, that is of polarity, may be a stepwise change. This is achieved by superimposing on a first layer of highly sulfonated terpolymer of styrene and at least divinylbenzene with optionally 2- or 4-vinylpyridine or acrylic acid as a third co-monomer, a second layer of an unsulfonated copolymer of divinylbenzene and at least one monomer belonging to the group consisting 2- or 4-vinylpyridine and acrylic acid, optionally with styrene as a third co-monomer. When using only two co-monomers for both the sulfonated layer and the unsulfonated layer, the degree of cross-linking, that is the amount of divinylbenzene contained in the formed copolymer, may be higher than 20% and may be as high as 50% or more.

The unsulfonated layer should not be thicker than 3 to 4 mils because beyond this maximum thickness, the voltage drop in the membrane is found to increase. Again, the total thickness of the two layered membrane may vary between 5 to 100 mil. A membrane supported on an asbestos paper, for example, will have an apparent thickness similar to the thickness of the asbestos paper which may be between 30 to 100 mil. However, the effective thickness of the ion-exchange resin impregnating the asbestos may be expected to vary between 5 and 20 mil.

The method of the invention for the preparation of the novel cationic membrane comprises impregnating an inert, porous support such as an asbestos paper, a felt or a mesh or PTFE, a felt or a mesh of polyester fibers with a solution or mixture of the said monomers in the appropriate ratio with up to 1% molar of a polymerization initiator such as dibenzoyl-peroxide or α,α'-azobisisobutyronitrile in a solvent such as benzene, acetone, toluene or xylene or any other suitable solvent, evaporating the solvent under vacuum at room temperature, placing the impregnated support in a closed reactor with a minimum gas space, preferably inside a teflon coated mould and heating at a temperature of about 60° to 100° C., preferably 80° to 90° C., for a period of 1 to 4 hours to attain complete copolymerization, cooling the material to room temperature, and preferably washing the membrane with solvent to remove low molecular weight polymers and unreacted monomers and then drying the latter. After swelling in sym-dichloroethane or other halogenated solvents, the membrane material is contacted over one side only with liquid sulfur trioxide diluted with liquid sulfur dioxide for a controlled period of time ranging from 5 min. to 60 min. depending on the thickness and on the type of porous support used and on the temperature which may vary from −40° C. up to room temperature to sulfonate the styrene aromatic rings down to a substantial depth from the surface exposed to contact with the sulfonating liquid mixture.

The method produces a membrane with a sulfonation degree and therefore a negative polarity which is maximum at the surface in contact with the sulfonating mixture and which decreases in a substantially gradual manner over the cross-section of the membrane down to a minimum at the unexposed surface of the membrane. Preferably, the equivalent weight referred to the sulfonic acid group is comprised between 600 and 1200 at the exposed surface and between 1200 and 2000 at the unexposed surface. This procedure will be thereinafter referred to as "partial sulfonation".

The sulfonated film of polymer may then be contacted with an aqueous alcoholic solution of an alkali metal hydroxide for a sufficient time to convert the $-SO_3H$ groups into their more stable form of $-SO_3Me$ where Me is an alkali metal such as sodium or potassium. This treatment stabilizes the membrane which may then be heated to 70° to 100° C., preferably 80° to 90° C. under vacuum, to release the water of hydration to obtain a dehydrated or dried stable membrane in its metal salt form which may be stored for any length of time.

In a modified embodiment of the invention, a layer of unsulfonated copolymer may be provided over one side of an uniformly sulfonated layer of the polymer to form a less hydrophilic layer having a greater ability to reject hydroxyl ions on the side of the membrane which contacts the strongly alkaline catholyte during operation in a chlor-alkali cell. The layer of sulfonated polymer may be a sulfonated copolymer of styrene and divinylbenzene optionally containing also the third co-monomer, that is 2- or 4-vinylpyridine or acrylic acid.

The layer of unsulfonated copolymer may be of the same type as that of the sulfonated copolymer, that is a terpolymer of styrene-divinylbenzene and 2- or 4-vinylpyridine or of styrene-divinylbenzene and acrylic acid, but preferably the layer of unsulfonated copolymer is a copolymer of divinylbenzene and 2- or 4-vinylpyridine or of divinylbenzene and acrylic acid. Most preferably, it is a layer of copolymer of divinylbenzene and 2- or 4-vinylpyridine.

Therefore, a modified method of the invention for preparing the cation-exchange membrane of the invention comprises (a) forming a thin sheet of copolymer, preferably by copolymerizing the mixture of co-monomers on an inert support and in the absence of solvent, (b) optionally treating the formed sheet with a swelling agent, preferably a halogenated solvent such as symdichloroethane, for several hours, normally for 2 to 12 hours at a temperature which may vary from room temperature up to 80° C.; (c) evenly sulfonating the sheet by immersing it in a solution of sulfur trioxide in liquid sulfur dioxide at a temperature between −40° C. and +20° C. for a period of time of 20 min. to 90 min.; (d) stabilizing the sulfonic groups by soaking the membrane in an aqueous alcoholic solution of an alkali metal hydroxide for a time sufficient to convert substantially all the —SO₃H groups to their metal salt form, that is —SO₃Me, where Me is an alkali metal such as sodium; (e) dehydrating or drying the membrane at a suitable temperature such as 70°–100° C. preferably under vacuum; (f) applying over one side of the sulfonated membrane a solution or a mixture of divinylbenzene and 2- or 4-vinylpyridine, or of acrylic acid and divinylbenzene or of styrene, divinylbenzene and 2- or 4-vinylpyridine or acrylic acid; (g) evaporating any solvent and then copolymerizing said monomers to form a layer of unsulfonated copolymer over the side of the membrane; and (h) optionally repeating steps (f) and (g) to form a layer of unsulfonated copolymer having the desired thickness, preferably from 0.1 to 3 mil., over the side of the sulfonated membrane.

Another modification of the process of the invention for preparing the cation-exchange membrane comprises (a) forming a thin sheet of copolymer, preferably by copolymerizing the mixture of co-monomers on an inert support and in the absence of a solvent, (b) applying over one side of the formed sheet a mixture or a solution of 2- or 4-vinylpyridine and divinylbenzene, (c) evaporating any solvent, and then copolymerizing the two monomers to form a layer over the previously formed sheet of terpolymer of styrene, divinylbenzene and 2- or 4-vinylpyridine or acrylic acid; (d) optionally repeating steps (b) and (c) to form a layer of copolymer having the desired thickness, preferably from 0.1 to 3 mil; (e) treating the two layered sheet with a swelling agent such as symdichloroethane for several hours, normally from 2 to 12 hours at a temperature between 20° and 80° C. and (f) sulfonating the two layered sheet by immersing the sheet in a solution of sulfur trioxide in liquid sulfur dioxide at a temperature between −40° and 20° C. for a period of time of 20 to 90 min.

The absence of styrene and acrylic acid in the 0.1 to 3 mil thick copolymer layer formed on one side of the membrane is highly preferred because it allows a much simplified procedure of sulfonation. The formed sheet may be sulfonated without strict control of time and temperature of sulfonation because of the practical impossibility of the sulfonating agent, namely SO₃, to react with the copolymer of vinylpyridine and divinylbenzene. These modified methods produce membranes with a high sulfonation degree (high polarity) which remains substantially uniform for a substantial depth from the anode side of the membrane and which falls to substantially nil near the cathode side of the membrane which region corresponds to the layer of unsulfonated copolymer formed over the side of the previously sulfonated copolymer sheet.

Various modifications of general methods described may be resorted to. For example, the porous support of inert material may not be used and membranes may be prepared by hot-pressing a mixture of the co-monomers, in the substantial absence of a solvent, in a teflon-lined press. Typical conditions are for 1 hour at 80° C. with a pressure of 0.5 kg/cm² to induce copolymerization and to obtain sheets of copolymer which may then be sulfonated by the above procedures.

The membranes of the invention are particularly useful in the electrolysis of alkali metal halide brines to produce the halogen and the alkali metal hydroxide such as chlorine and caustic soda but may also be used in other electrolysis reactions.

The novel electrolytic process of the invention for the preparation of a chemical product comprises providing an electrolyte containing the elements of the product to be produced in the electrolytic cell with an anode and a cathode separated by a cationic membrane permeable to ions but fluid impermeable comprised of a partly sulfonated terpolymer of styrene, divinylbenzene and at least one member of the group consisting of 2-vinylpyridine, 4-vinylpyridine and acrylic acid, the degree of sulfonation varying through the membrane cross-section from a maximum on the anodic surface to a minimum at the cathodic surface, passing an electrolysis current through the anode, cathode and electrolyte and recovering said chemical product from the said cell.

The novel electrolytic cell of the invention comprises a cell housing containing at least one anode in an anode compartment and at least one cathode in a cathode compartment forming an interelectrodic gap with a cation exchange member of the invention separating the anode and cathode compartments.

Divinylbenzene has the formula

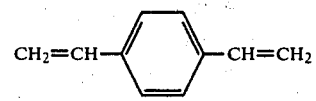

In the following examples there are described several preferred embodiments to illustrate the invention. However, it is to be understood that the invention is not intended to be limited to the specific embodiments.

EXAMPLE 1

2 pieces of asbestos paper (0.025 L/FX 36 of John Mansville) measuring 120×120 mm were soaked in a solution of 75% by volume at 20° C. of 4-vinylpyridine-styrene-divinylbenzene mixture (molar composition 80%-10%-10%) in 25% by volume of benzene. The solution also contained as a polymerization/initator 1 mole percent of dibenzoylperoxide (based on monomers). The papers were removed from the solution and the benzene was evaporated under reduced pressure. The papers were then placed in a closed reactor with a minimum of empty space and were held at 80° C. for two hours to effect polymerization. The papers were then washed with benzene to remove unreacted monomers and low molecular weight polymers and were then dried.

The amount of polymer in each case represented 38% by weight of the treated paper and both sheets were substantially impermeable to fluid flow. One of the sheets was allowed to stand in sym-dichloroethane for 12 hours at 70° C. and was then placed in a reactor designed to allow contact of only one side of the sheet with a solution of liquid sulfur trioxide in liquid sulfur dioxide at −30° C. The temperature of the solution was slowly raised over 30 minutes to 10° C. and the paper was dried to obtain a membrane A with a different polarity on each side. A sample was taken from each side of the membrane and the elemental analysis and the equivalent weights (EW) with respect to the sulfonic acid groups are reported in Table I.

TABLE I

|  | %C | %H | %N | %O | %S | EW |
|---|---|---|---|---|---|---|
| sample taken from the surface of the side contacted with the sulfonation solution | 76.8% | 6.45% | 9.65% | 4.2% | 2.8% | 1152 |
| sample taken from the surface of side not in contact with the sulfonation solution | 78.65% | 6.6% | 9.9% | 2.86% | 1.9% | 1700 |

For comparison purposes, the second sheet was similarly treated with sym-dichloroethane and thereafter sulfonated by the same method as described for membrane (A), except that in this case the contact with the sulfonating solution was made to occur on both sides of the sheet to obtain a uniformly sulfonated membrane (B). Samples taken from both sides of the sulfonated membrane were analyzed and the results of the elemental analysis were the same for both side as indicated hereinbelow:

| %C | %H | %N | %O | %S |
|---|---|---|---|---|
| 76.95 | 6.4 | 9.7 | 4.16 | 2.77 |

The transport number was measured for both membranes; membrane (A) showed a transport number of 0.98 and membrane (B) showed also a transport member of 0.98 so that no appreciable difference in transport number was observed under the conditions of measurement.

The two membranes thus obtained were placed in two similar test cells for the electrolysis of sodium chloride brine. The test conditions were as follows:

| anode | Titanium mesh activated with mixed oxides of ruthenium and titanium |
|---|---|
| cathode | low carbon steel mesh |
| anolyte | NaCl 310 g/l |
| catholyte | $Ca^{2+}$ + $Mg^{2+}$ 25 ppm |
|  | NaOH 25% |
| temperature | 85° C. |
| current density over membrane surface | 1800 A/m$^2$ |

After 1500 hours of operation, the average operating results for the test cell equipped with membrane (A) and membrane (B) were respectively as reported in Table II.

TABLE II

|  | Cell Voltage V | % Cathodic Current Efficiency | g/l Chloride Content in Catholyte |
|---|---|---|---|
| membrane (A) | 3.7 | 90 to 91 | 0.01 |
| membrane (B) | 3.65 | 82 to 84 | 0.01 |

The data of Table II indicates that membrane (A) having a sulfonation degree which varies through the cross-section of the membrane from a maximum at the anode side of the membrane to a minimum at the cathode side of the membrane, shows a much higher efficiency than membrane (B) which is uniformly sulfonated throughout its thickness. Moreover, the cell voltage in the case of membrane (A) is only slightly higher than in the case of membrane (B).

In both cases, the cell voltage did not show any remarkable increase with time of operation, although a relatively high amount of calcium and magnesium had been purposedly added to the brine. This appears to indicate that the cross-linked sulfonated copolymer membranes are not as strongly susceptible to aging in the presence of calcium and magnesium cations as are perfluorosulfonic acid membranes commercially used.

EXAMPLE 2

A 150×150 mm Teflon felt with a thickness of 0.5 mm was soaked with a mixture of 4-vinylpyridine, styrene and divinylbenzene having the following molar composition: 70% of 4-vinylpyridine, 20% of styrene and 10% of divinylbenzene. Dibenzoylperoxide was present in an amount of 1 mole percent with respect to the overall moles of monomers as copolymerization initator.

The soaked felt was then hot-pressed in a Teflon lined press at a temperature of 80° C. and at a pressure of 0.5 kg/cm$^2$ for one and half hours to effect copolymerization. A compact sheet, 0.5 mm thick and impervious to fluid flow, was obtained wherein the copolymer was present in an amount of 60% by weight. The sheet was then treated first in symdichloroethane and then contacted on one side only with the sulfonating solution by the procedure of Example 1 for the case of membrane (A). Samples from the two sides of the membrane, on elemental analysis, were characterized by the following composition:

TABLE III

|  | %C | %H | %N | %O | %S |
|---|---|---|---|---|---|
| sample from contacted side | 72.8 | 6.7 | 7.8 | 7.7 | 5.2 |
| sample from uncontacted side | 78.7 | 7.23 | 8.38 | 3.4 | 2.26 |

The equivalent weights of the two samples, that is of the two sides of the membrane, with respect to the sulfonic groups, were 610 for the contacted side and 1400 for the uncontacted side.

The sulfonated membrane was tested for the electrolysis of brine in the same test cell and under the same conditions as indicated in Example 1. After 500 hours of operation, the average operating results were as follows: cell voltage—3.9 V; cathodic current efficiency—90% and chloride content in the catholyte—0.005 g/l.

EXAMPLE 3

A 120×120 mm Teflon felt with a thickness of 0.6 mm was soaked with a mixture having the following molar composition: 40% of styrene, 40% of 2-vinylpyridine, 20% of divinylbenzene and 1% (by moles with respect to the total moles of the monomers) of dibenzoylperoxide.

The felt was then placed in a teflon-lined press and held at 80% for 1 hour under a pressure of 0.5 kg/cm$^2$ to obtain a fluid-impervious sheet with a polymeric content of 50% by weight and a thickness of 0.6 mm. The sheet was immersed in sym-dichloroethane for 12 hours at 80° C. and thereafter sulfonated at −30° C. with liquid sulfur trioxide in liquid sulfur dioxide while slowly raising the temperature to −10° C. over a period of twenty minutes. After the sulfonation, the membrane thus obtained was stabilized by treating it with a sodium hydroxide hydroalcoholic solution whereby the —SO₃H groups were converted to —SO₃Na groups. The membrane was then dried at 80° C. under vacuum. One side of the membrane was coated with a mixture of the following molar composition: 92% of 2-vinylpyridine, 8% of divinylbenzene and 1% (moles of respect to the total moles of monomers) of dibenzoylperoxide and was held for 3 hours at 80° C. in a reactor to effect copolymerization to obtain a copolymeric layer 0.05 mm thick.

A sample was taken from the sulfonated membrane, prior to stabilization with NaOH, and another was taken from the 2-vinylpyridine/divinylbenzene copolymeric layer added thereon and their elemental analysis gave the following results:

|  | % C | % H | % N | % O | % S |
|---|---|---|---|---|---|
| sulfonated copolymer sample | 71.84 | 5.96 | 4.18 | 10.75 | 7.17 |
| unsulfonated copolymer sample | 81.1 | 6.75 | 12.0 | trace | trace |

The presence of trace-amounts of oxygen and sulfur in the unsulfonated copolymer sample was due to imprecise sampling which caused contamination of the sample by material coming from the underlying sulfonated copolymer. The equivalent weight (EW) with respect to the sulfonic groups of the two samples, that is of the two sides of the membrane, was 450 for the sulfonated sample and extremely high for the unsulfonated sample.

The two layer membrane was tested for the electrolysis of brine in the same test cell and under the same conditions as indicated in Example 1. After 48 hours of operation, the average operating results were as follows: cell voltage—3.5 V, cathodic current efficiency—91.5% and chlorine content in the cathode—0.01 g/l.

EXAMPLE 4

Two identical 0.6 mm thick Teflon felts were soaked with a mixture having the following molar composition: 40% of acrylic acid, 50% of styrene, 10% of divinylbenzene and 1% (with respect to the total moles of monomers) of α-α'-azobisisobutyronitrile. The felts were placed in a Teflon-lined press and held at 80° C. for 3 hours under a pressure of 0.5 kg/cm². The fluid impervious sheets thus obtained were treated with sym-dichloroethane at 70° C. for 12 hours, and were then sulfonated with liquid SO₃ in liquid SO₂, starting from a temperature of −30° C. and slowly raising it up to 20° C. over a period of thirty minutes. Sulfonation occurred mainly at the aromatic ring of styrene and to a lesser extent, at the α-carbon atom of acrylic acid.

One of the membranes thus obtained (C) was treated with an aqueous ethanol solution of NaOH to convert the —SO₃H groups to their sodium salt form. The membrane (C) was then spread on one side with a mixture of the following molar composition: 90% of 4-vinylpyridine, 10% of divinylbenzene and 1% (by moles with respect to the total moles of monomers) dibenzoylperoxide and then was heated in a reactor at 80° C. for 3 hours to effect copolymerization to finally obtain an 0.05 mm thick 4-vinylpyridine/divinylbenzene copolymer layer on one side of the sulfonated membrane (C).

The two-layer membrane (C) and the single layer membrane (D) were both tested in the same cell and under the same conditions as described in Example 1. After 100 hours of operation, the average operating results were reported in the following Table IV:

TABLE IV

|  | Cell Voltage | Cathodic Current Efficiency | Chloride Content in the Catholyte |
|---|---|---|---|
| membrane (C) | 3.8 V | 90% | 0.005 g/l |
| membrane (D) | 3.2 V | 50% | 0.005 g/l |

The relative cathodic current efficiencies obtained with the two membranes show that the unsulfonated copolymer layer applied over the cathode side of the sulfonated copolymer membrane greatly improves the —OH rejection with a marked favorable effect on efficiency.

EXAMPLE 5

A 120×120 mm asbestos paper of the 0.025" L/FX36" type manufactured by John Mansville Co. was soaked with a mixture having the following molar composition: 66% of styrene (ST), 34% of divinylbenzene (DVB) and 1% (molar with respect to the total moles of monomers) of dibenzoylperoxide. The paper was then placed in a Teflon-lined press and held at 80° C. for 1 hour at a pressure of 0.5 kg/cm² to produce a fluid-impervious sheet with a ST/DVB polymer load of 65% by weight. One side thereof was then coated with a mixture of the following composition by moles: 85% of 4-vinylpyridine (4VP), 15% of divinylbenzene (DVB) and 1% (molar ratio with respect to the total moles of monomers) of dibenzoylperoxide and was then held for 2.5 hours at 80° C. in a reactor to effect copolymerization to obtain a 0.03 mm-thick 4-VP/DVB polymer layer. A double-layer membrane was thus obtained which, after swelling for 10 hours in sym-dichloroethane at 70° C., was then sulfonated at −30° C. with liquid SO₃ dissolved in liquid SO₂ while raising the temperature to −10° C. over 20 minutes to obtain a sulfonated membrane exhibiting a different polarity on each side. Samples were taken from both sides of the membrane and the elemental analysis thereof gave the following results:

|  | % C | % H | % N | % O | % S |
|---|---|---|---|---|---|
| sulfonated ST/DVB copolymer sample | 79.8 | 6.62 | — | 8.05 | 5.36 |
| unsulfonated 4 VP/DVB copolymer sample | 82.2 | 6.83 | 10.9 | trace | trace |

The presence of trace amounts of oxygen and sulfur in the unsulfonated copolymer sample is due to imprecise sampling which caused contamination of the sample by material coming from the underlying sulfonated copolymer. The equivalent weights (EW) with respect to the sulfonic groups of the two samples of the two sides of the membrane were 550 for the sulfonated sample and extremely high for the unsulfonated sample.

The two layer membrane was tested for brine electrolysis in the same test-cell and under the same conditions as indicated in Example 1. After three days of operation, the average operating results were as follows: cell voltage—3.8 V, cathodic current efficiency—91% and chloride content in the catholyte—0.01 g/l. Also in this case, as in Example 4, the unsulfonated copolymer layer of the cathode side of the membrane appears to be highly effective in hindering hydroxyl ion back-diffusion.

Various modifications of the products and processes of the invention may be made without departing from the spirit or scope thereof and it should be understood that the invention is intended to be limited only as defined in the appended claims.

We claim:

1. A fluid impermeable cation exchange membrane comprising a partly sulfonated terpolymer of styrene, divinylbenzene and at least one member of the group consisting of 2-vinylpyridine and 4-vinylpyridine, the degree of sulfonation varying through the membrane cross-section from a maximum on the surface adapted to face the anode to a minimum at the surface adapted to face the cathode.

2. The cation exchange membrane of claim 1 wherein the molar ratio of styrene to the vinylpyridine is between ⅛ and 1/1 and the molar percentage of divinylbenzene in the copolymer is from 8 to 20%.

3. The cation exchange membrane of claim 1 wherein the degree of sulfonation expressed in equivalent weight referred to the sulfonic acid groups is between 400 and 1300 at the surface of the membrane facing the anode and is between 1000 and 3000 at the surface of the membrane facing the cathode.

4. A membrane electrochemical cell comprising a cell housing containing at least one anode in an anode compartment and at least one cathode in a cathode compartment forming on interelectrodic gap with a cation exchange membrane of claim 1 separating the anode and cathode compartments.

5. The cell of claim 4 wherein the sulfonated terpolymer is a terpolymer of styrene, divinylbenzene and at least one member of the group consisting of 2- and 4-vinylpyridine wherein the molar ratio of styrene to the vinylpyridine is between ⅛ and 1/1 and the molar percentage of divinylbenzene in the copolymer is from 8 to 20%.

6. The cell of claim 4 wherein the degree of sulfonation expressed in equivalent weight referred to the sulfonic acid groups is between 400 and 1300 at the surface of the membrane facing the anode and is between 1000 and 3000 at the surface of the membrane facing the cathode.

7. An electrolytic process for the preparation of a chemical product comprising placing an electrolyte containing the elements of the product to be produced in an electrolysis cell of claim 4 and passing an electrolysis current through the anode, cathode and electrolyte and removing the said chemical product from the cell.

8. The process of claim 7 wherein the sulfonated terpolymer is a terpolymer of styrene, divinylbenzene and at least one member of the group consisting of 2- and 4-vinylpyridine wherein the molar ratio of styrene to the vinylpyridine is between ⅛ and 1/1 and the molar percentage of divinylbenzene in the copolymer is from 8 to 2%.

9. The process of claim 7 wherein the degree of sulfonation expressed in equivalent weight referred to the sulfonic acid groups is between 400 and 1300 at the surface of the membrane facing the anode and is between 1000 and 3000 at the surface of the membrane facing the cathode.

* * * * *